United States Patent [19]

Hiromoto et al.

[11] Patent Number: 5,129,672
[45] Date of Patent: Jul. 14, 1992

[54] SUSPENSION SYSTEM FOR A VEHICLE

[75] Inventors: Shuji Hiromoto; Roh Kitamura; Fumitaka Yoshino; Takeshi Kamisaku; Toshihiro Takehana, all of Yokohama, Japan

[73] Assignee: NHK Spring Co., Ltd., Yokohama, Japan

[21] Appl. No.: 667,572

[22] Filed: Mar. 11, 1991

[51] Int. Cl.⁵ .............. B60G 11/04; B60G 11/10
[52] U.S. Cl. .................. 280/720; 267/260; 267/41; 267/148; 301/124 R
[58] Field of Search ............ 280/111, 112.1, 112.2, 280/689, 718, 720, 721, 723; 267/40, 273, 41, 148, 149, 260; 301/124 R

[56] References Cited

U.S. PATENT DOCUMENTS

| 1,149,617 | 8/1915 | Bick | 267/41 |
|---|---|---|---|
| 1,336,829 | 4/1920 | Ewing | 267/41 |
| 1,982,890 | 12/1934 | Urschel | 301/124 R |
| 1,986,949 | 1/1935 | Urschel | 301/124 R |
| 2,953,372 | 9/1960 | Haley | 267/41 |
| 3,005,642 | 10/1961 | Hertel | 280/723 |
| 3,142,598 | 7/1964 | Rosen | 156/162 |
| 4,530,490 | 7/1985 | Misumi et al. | 267/47 |
| 4,546,958 | 10/1985 | Ohno et al. | 267/47 |
| 4,557,500 | 12/1985 | Collard et al. | 280/669 |
| 4,560,525 | 12/1985 | Ryan | 264/136 |
| 4,753,835 | 6/1988 | Misumi et al. | 428/74 |

FOREIGN PATENT DOCUMENTS

| 0243191 | 4/1986 | European Pat. Off. . | |
| 0202964 | 11/1986 | France . | |
| 60-52103 | 4/1985 | Japan . | |
| 62-131905 | 8/1987 | Japan . | |
| 2-34828 | 9/1990 | Japan | 267/148 |
| 2145797A | 7/1984 | United Kingdom . | |

OTHER PUBLICATIONS

"Automotive Engineering"; Aug. 1982; pp. 71-78.
Automotive Engineer, vol. 14, No. 3, Jun. 1989, Bury St. Edmunds, GB, p. 8.
Automotive Engineer, vol. 8, No. 3, Jun. 1983, Bury St. Edmunds, GB, pp. 40-43.

Primary Examiner—Charles A. Marmor
Assistant Examiner—Tamara L. Graysay
Attorney, Agent, or Firm—Frishauf, Holtz, Goodman & Woodward

[57] ABSTRACT

A suspension system comprising a pair of fiber reinforced plastic spring arms, right and left, and a beam assembly connecting the respective free ends of the arms, said springs arms having a free-end-side portion and being vertically bendable, each spring arm serving as a suspension spring. A fixed end of each spring arm is fixed to a vehicle body. The beam assembly, which extends in the transverse direction of the vehicle body, includes an intermediate beam member of fiber reinforced plastic and metallic end beam members fixed individually to two opposite end portions of the intermediate beam member. Each end beam member is provided with an axle. If the right and left spring arms are subjected to loads of opposite phases at the time of turning, the intermediate beam member is twisted to produce a stabilizer effect.

17 Claims, 5 Drawing Sheets

SUSPENSION SYSTEM FOR A VEHICLE

BACKGROUND OF THE INVENTION

1. Field of the Invention

The present invention relates to a suspension system used in a vehicle such as an automobile.

2. Description of the Related Art

Steel leaf springs or coil springs have conventionally been used as suspension springs for vehicles. Further, vehicular stabilizers have been used as means for increasing the rolling stiffness of vehicle bodies. Conventional stabilizers are formed independently of suspension springs. A stabilizer comprises a rod-shaped torsion section, which extends in the transverse direction of a vehicle, and a pair of arm sections continuous with the opposite ends of the torsion section. Generally, the torsion section of the stabilizer is supported on the vehicle body by means of brackets with rubber bushes. The arm sections are connected to axle-side components, such as a lower arm, by means of stabilizer links.

The suspension coil springs, which are disposed vertically so that their axes extend in the vertical direction, have a great upward projection. Therefore, spaces for storing the upper portions of the suspension springs are needed in the trunk room or engine room. This results in a narrow interior space of the vehicle. Since the suspension springs and the stabilizer must be mounted separately, moreover, the whole suspension system requires a complicated structure and use of many components. Furthermore, it is hard to secure mounting spaces for the suspension springs and the stabilizer.

A suspension system disclosed in Published Unexamined Japanese Utility Model Application No. 62-131905 comprises a pair of cantilever leaf springs, and a steel axle connecting the respective free ends of the springs. This axle is a substantially rigid body. In this conventional example, a stabilizer is required independently of the leaf springs. In this case, moreover, the axle is a long steel member extended between right and left wheels, and therefore, is inevitably heavy in weight.

SUMMARY OF THE INVENTION

Accordingly, the object of the present invention is to provide a suspension system for a vehicle, whose upward projection is smaller than that of conventional suspension systems using suspension coil springs, and which can serve also as a stabilizer, and is light in weight.

A suspension system according to the present invention, which has been developed to achieve the above object, comprises: a left and right cantilever spring arms both made of fiber reinforced plastic, each having a fixed end fixed to a vehicle body and a free-end-side portion extending toward axle means and vertically bendable; a beam assembly extending in the transverse direction of the vehicle body and having connecting portions connected to the respective free-end-side portions of the pair of spring arms; and connecting means for connecting the spring arms to the beam assembly, the beam assembly including a pair of metallic end beam members provided at the connecting portions thereof connected to the spring arms and an intermediate beam member of fiber reinforced plastic having two opposite end portions fixed individually to the end beam members.

Each end beam member is formed of a hollow member, such as a round or rectangular pipe.

In a vehicle provided with the suspension system constructed in this manner, its sprung weight is elastically supported by means of the right and left spring arms. Vertical displacements of wheels caused when the vehicle runs on a rough road surface are absorbed by the arms which bend vertically. When the vehicle curves or turns to change its course, the vehicle body is subjected to a transverse acceleration, so that its inside with respect to the turn is lifted, while the outside sinks. In this case, therefore, the two spring arms bend in opposite directions, so that the intermediate beam member is twisted. A resulting reaction force serves to keep the vehicle body horizontal, as in the case of a conventional stabilizer.

Thus, the beam assembly functions both an axle means and as a stabilizer. The Young's modulus of the intermediate beam member, made of fiber reinforced plastic, is much lower than that of a steel beam, so that it can undergo a deflection large enough for a stabilizer effect.

Since the suspension system of the present invention is smaller in vertical size than conventional suspension systems using suspension coil springs, the vehicle can enjoy a wide interior space. Since the combination of the spring arms and the beam assembly functions as a stabilizer, moreover, the whole suspension system requires use of fewer components than the conventional systems, and its structure is simpler. Furthermore, the spring arms and the intermediate beam member, which are formed of fiber reinforced plastic, never rust, and are light in weight.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
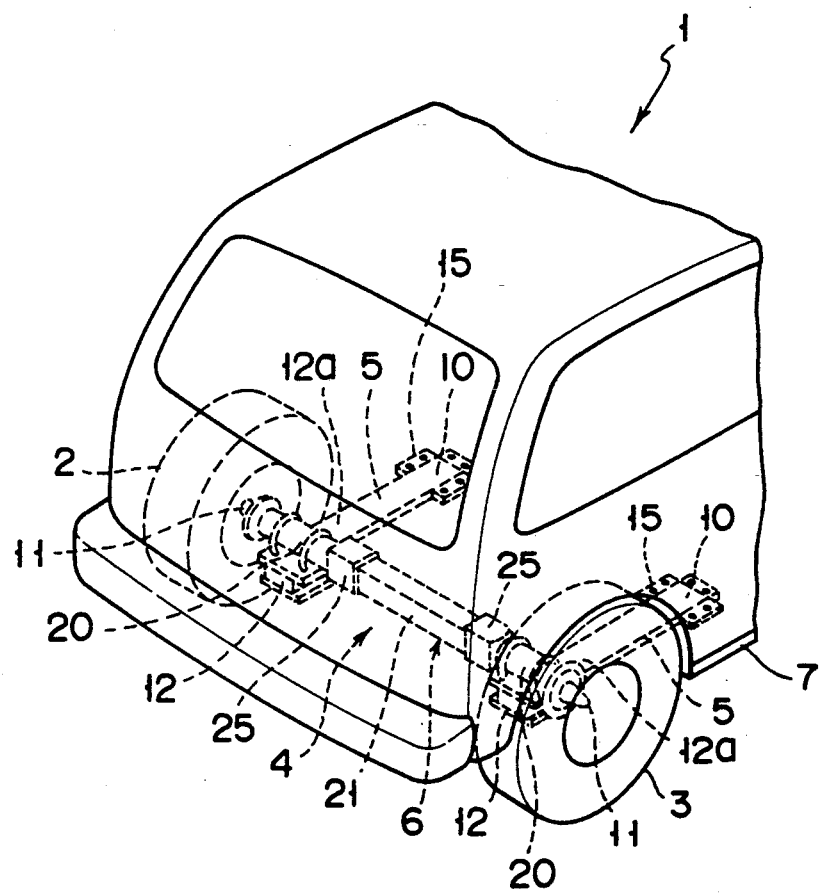
FIG. 1 is a perspective view showing the rear portion of an automobile provided with a suspension system according to a first embodiment of the present invention.

A first embodiment of the present invention will now be described with reference to the drawings of FIGS. 1 to 5, which show a rear suspension system for an automobile. The automobile 1 shown in FIG. 1 is provided with a pair of rear wheels 2 and 3. The wheels 2 and 3 are supported on a vehicle body 7 by means of the suspension system 4.

The suspension system 4 comprises a left and right cantilever spring arms 5 both made of fiber reinforced plastic (hereinafter referred to as FRP), and a beam assembly 6 extending in the transverse direction of the vehicle body 7 (shown only partially). Each spring arm 5 is in the form of a leaf comprised of a resin matrix 8 and a large number of continuous reinforcing fibers 9 extending in the longitudinal direction of the arm. The fibers 9 are contained throughout the cross section of each arm 5. Each arm 5 has a fixed end 10 fixed to the vehicle body 7 and a free end 12 situated beside an axle 11. The arms 5 extend in the longitudinal direction of the body 7.

Figure 3:
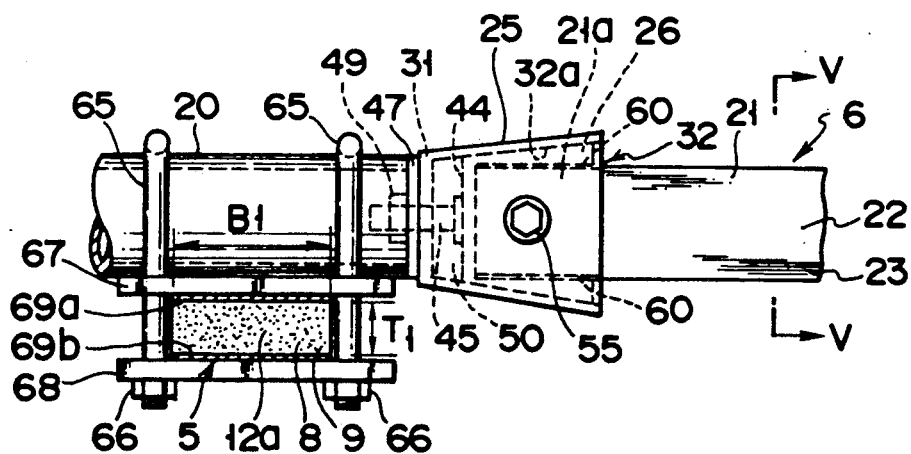
FIG. 3 is a partial front view of the suspension system shown in FIG. 1.

The spring arms 5 may be arranged parallel to a center line which extends in the longitudinal direction of the vehicle body 7, as viewed from above, or be arranged in the shape of a V such that the distances between their respective fixed ends 10 and between their respective free ends 12 vary in the longitudinal direction of the vehicle body. As shown in FIG. 3, each arm 5 has a rectangular profile (in the direction perpendicular to the longitudinal direction of the arm) which is long from side to side, that is, whose width B1 is greater than its thickness T1.

The fixed end 10 of each spring arm 5 is fixed to the vehicle body 7 by means of fixing members 15 and bolts (not shown) or the like. Thus, each arm 5 functions as a cantilever spring such that its free-end-side portion 12a can elastically bend in the vertical direction. Each spring arm 5 may be tapered so that its thickness decreases from the fixed end 10 toward the free end 12 without changing its width, or that its width and thickness increase and decrease, respectively, from the fixed end 10 toward the free end 12.

The beam assembly 6 connects the respective free ends 12 of the spring arms 5. It is comprised of a pair of end beam members 20, each formed of a round steel pipe fixed to its corresponding arm 5, and an intermediate beam member 21 of FRP situated between the end beam members 20. The intermediate beam member 21, like each spring arm 5, is comprised of a resin matrix 22 and a large number of continuous reinforcing fibers 23 extending in the longitudinal direction of the member 21. The fibers 23 are contained throughout the cross section of the beam member 21.

Figure 5:
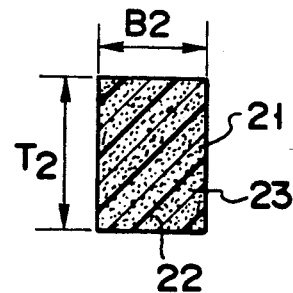
FIG. 5 is a sectional view taken along line V—V of FIG. 3.

As shown in FIG. 5, the intermediate beam member 21 has a vertically elongated rectangular profile whose thickness (height) T2 is greater than its width B2 in the longitudinal direction of the vehicle body. The overall length of the beam assembly 6 is 1,140 mm, for example. The intermediate beam member 21 is 400 mm long, 66 mm thick (T2), and 22 mm wide (B2), for example. The glass fiber content of the beam member 21 with respect to the longitudinal direction thereof is 72.5% by weight. The torsional rigidity of the intermediate beam member 21 is $1.025 \times 10^5$ (kgf.mm/degree), for example. It is to be desired that the profile of the member 21, which may be substantially square, should be rectangular.

Figure 4:
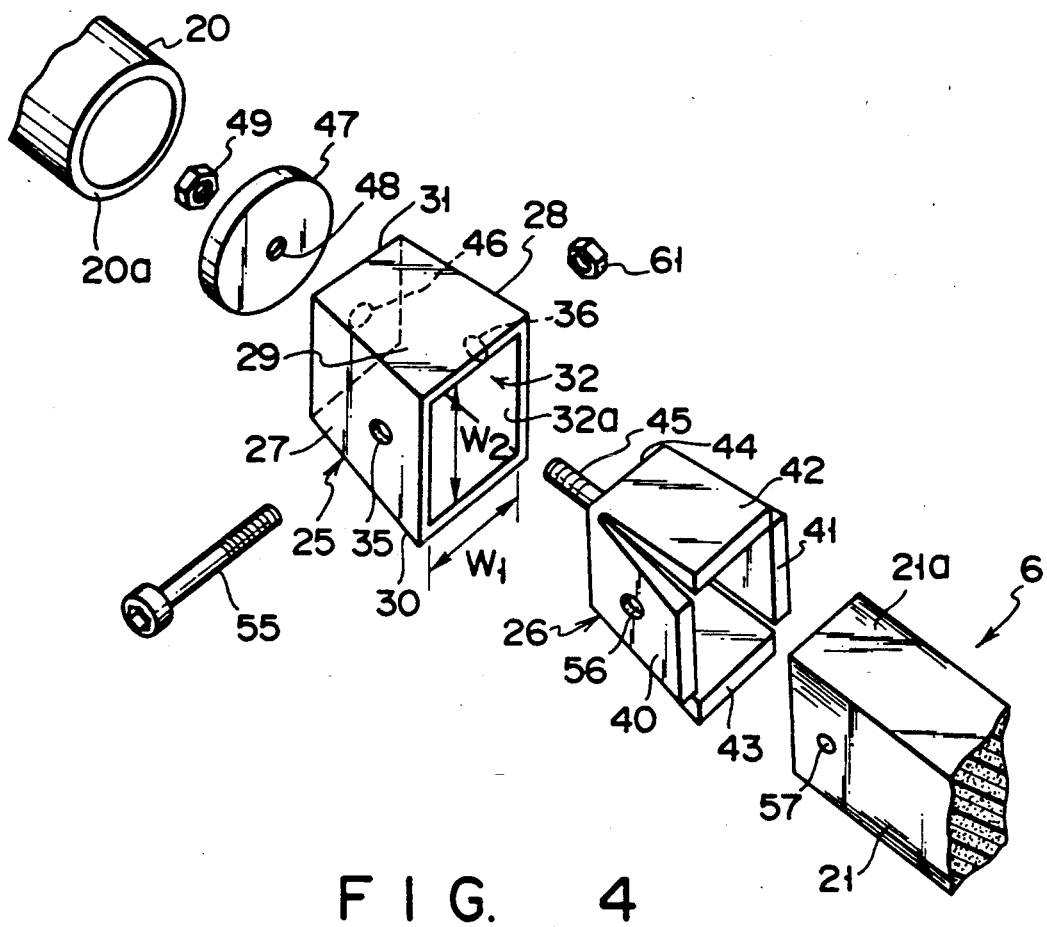
FIG. 4 is a partial exploded perspective view of the suspension system shown in FIG. 1.

Each end beam member 20 and the intermediate beam member 21 are rigidly connected to each other by means of a connecting box 25, made of metal such as steel, and a wedge-shaped spacer 26. As shown in FIG. 4, the connecting box 25 has four side plates 27, 28, 29 and 30, an end plate 31 situated on one end side of the box 25, and an opening portion 32 situated on the other end side of the box 25. Each side plate of the box 25 has the shape of a trapezoid such that the distance W1 between the left and right side plates 27 and 28 and the distance W2 between the top and bottom side plates 29 and 30 are both narrowed toward the end plate 31. The side plates 27 and 28 are provided with bolt holes 35 and 36, respectively.

The wedge-shaped spacer 26 includes four split pieces 40, 41, 42 and 43 and an end plate 44. Each piece is tapered so that its thickness decreases toward its forward end. The spacer 26 is inserted into the connecting box 25 through the opening portion 32 thereof.

A bolt 45 is attached to the center of the end plate 44 of the wedge-shaped spacer 26. It is passed through a hole 46 which is bored through the end plate 31 of the connecting box 25. The bolt 45 is further passed through a center hole 48 of a washer plate 47 which is fixed to the end beam member 20. A nut 49 is threadedly fitted on the bolt 45. The bolt 45 and the nut 49 constitute clamping means for causing the spacer 26 to be fixedly caught between an inner surface 32a of the box 25 and the outer surface of the intermediate beam member 21. As shown in FIG. 3, a suitable gap 50 is secured between the respective end plates 44 and 31 of the spacer 26 and the connecting box 25 so that the spacer 26 can be fully pushed into the box 25.

Holes 56 (only one of which is shown in FIG. 4) for a bolt 55 are bored individually through the split pieces 40 and 41 of the wedge-shaped spacer 26. A hole 57 for the bolt 55 is also bored through an end portion of the intermediate beam member 21. A buffer sheet 60 is provided as required between the beam member 21 and the spacer 26. The buffer sheet 60, which is bonded to the member 21 and the spacer 26, serves to prevent the FRP beam member 21 from wearing and to make the surface pressure on the beam member 21 uniform.

In connecting the end beam member 20 and the intermediate beam member 21 by means of the connecting box 25, the wedge-shaped space 26 is inserted into the box 25 in a manner such that it is put on an end portion 21a of the member 21. After the bolt 45 is passed through the respective holes 46 and 48 of the end plate 31 and the washer plate 47, the nut 49 is screwed onto the bolt 45. By doing this, the spacer 26 is drawn closer to the end plate 31, so that it is tightly caught between the intermediate beam member 21 and the connecting box 25. Thus, the beam member 21 and the box 25 are firmly clamped together in the thickness direction with the spacer 26 between them. After the nut 49 is tightened with a predetermined torque, the bolt 55 is passed through the holes 35, 36, 56 and 57, and is fixed by means of a nut 61. Thereafter, the washer plate 47 is welded to an end face 20a of the end beam member 20.

Figure 2:
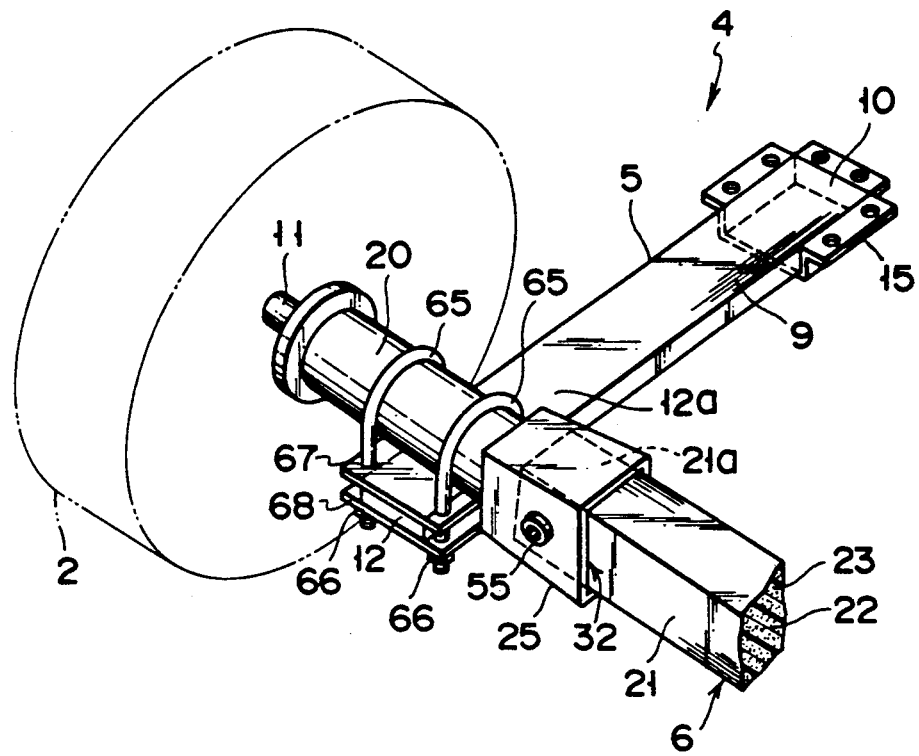
FIG. 2 is a partial perspective view of the suspension system shown in FIG. 1.

As shown in FIGS. 2 and 3, the end beam member 20 is fixed to the free-end-side portion 12a of the spring arm 5 by means of an U-bolt 65, a nut 66, washer plates 67 and 68, etc. Buffer spacers 69a and 69b are interposed between the portion 12a and the washer plates 67 and 68.

The sprung weight of the automobile 1, provided with the suspension system 4 constructed in this manner, is elastically supported by means of the spring arms 5. The arms 5 function as suspension springs. While the automobile 1 is running, the up-and-down motions of the wheels 2 and 3, caused by the roughness of the road surface, are absorbed by the respective free-end-side portions 12a of the spring arms 5 which bend vertically. If the left and right spring arms 5 are subjected to loads of opposite phases due to a centrifugal force produced at the time of a change of course or curving, the arms 5 bend in opposite directions so that the intermediate beam member 21 is twisted. If the beam member 21 is twisted in this manner, a reaction force around the member 21 is produced depending on the size of the twist. Accordingly, a force to twist one end side of the beam assembly 6 is transmitted to the spring arm 5 on the other end side of the assembly 6. This twisting force acts on the arm 5 as a force to keep the vehicle body horizontal. Thus, the suspension system 4 fulfills its function as a stabilizer. Since the Young's modulus of the intermediate beam member 21, made of FRP, is lower enough than that of a structural element made of steel, a sufficient deflection can be ensured for a stabilizer effect.

The spring arms 5 function as structural elements for supporting the load acting in the longitudinal direction of the vehicle body. The intermediate beam member 21 serves as a structural element for supporting the load acting in the transverse direction of the vehicle body. Thus, in the suspension system 4 according to the present embodiment, use of conventional rigid auxiliary members, such as lateral rods, tension rods, etc., can be reduced or omitted.

Since the upward projection of the suspension system 4 of this embodiment is smaller than that of conventional suspension systems using suspension coil springs, so that the trunk space and the like can be widened. Since the FRP is used as the material for the spring arms 5 and the intermediate beam member 21, moreover, the whole system 4 is light in weight. More specifically, the weight ratio between a conventional strut-type suspension system using suspension coil springs and the suspension system 4 of the present embodiment is 100:69. The weight ratio for the case in which a rigid body formed of a round steel pipe similar to a conventional axle housing is used in place of the beam assembly 6 of the present embodiment is 100:83. Further, the weight ratio for the case in which a steel beam having a vertically elongated rectangular profile and vertical rigidity equal to that of a round steel pipe is used is 100:75. In any of these comparative examples, the weight of the system is heavier than the suspension system 4 of the present embodiment.

Figure 6:
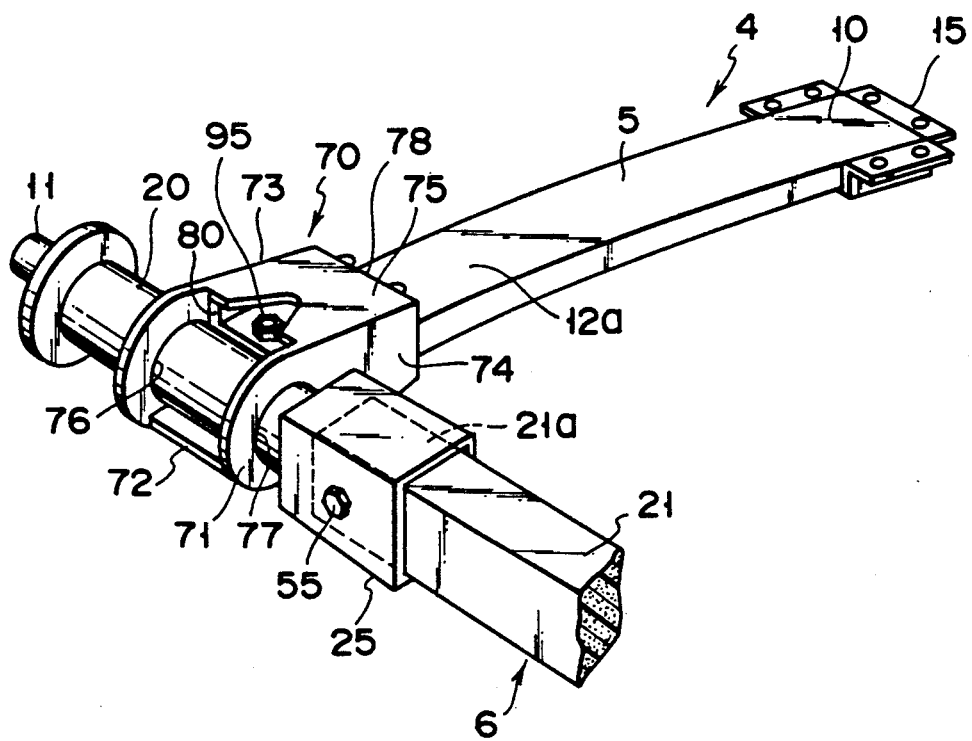
FIG. 6 is a partial perspective view of a suspension system according to a second embodiment of the invention.

In a second embodiment of the present invention shown in FIG. 6, a spring arm 5 and a beam assembly 6 is connected to each other by means of a connecting mechanism 70. The beam assembly 6 is constructed in the same manner as in the first embodiment described above. The connecting mechanism 70 is provided with a metal frame 71, which includes a bottom wall 72 put on the arm 5, a pair of side walls 73 and 74 rising on either side of the bottom wall 72, and a top wall 75 facing the bottom wall 72. The side walls 73 and 74 are formed having holes 76 and 77, respectively, through which an end beam member 20 is passed. Each side wall is shaped so that its upper edge declines from one end (having the hole 76 or 77) toward the other end 78 of the frame 71, as viewed sideways. Thus, the top wall 75 also declines from the one end side toward the other end 78. The spring arm 5 and the frame 71 are firmly fixed to each other by means of a wedge member 80 which is interposed between the top wall 75 and the arm 5.

Figure 7:
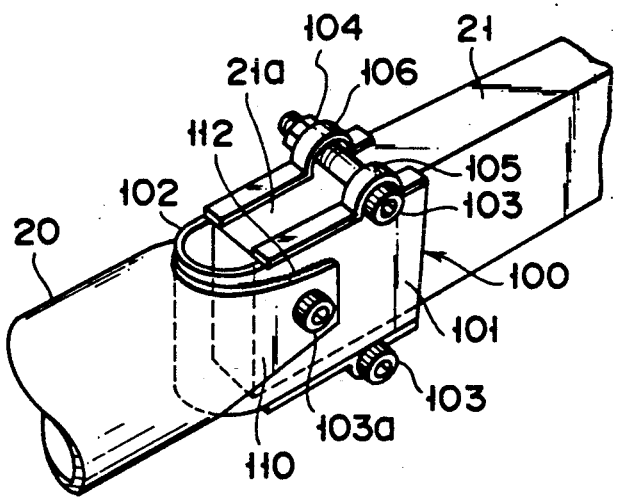
FIG. 7 is a partial perspective view of a suspension system according to a third embodiment of the invention.
Figure 8:
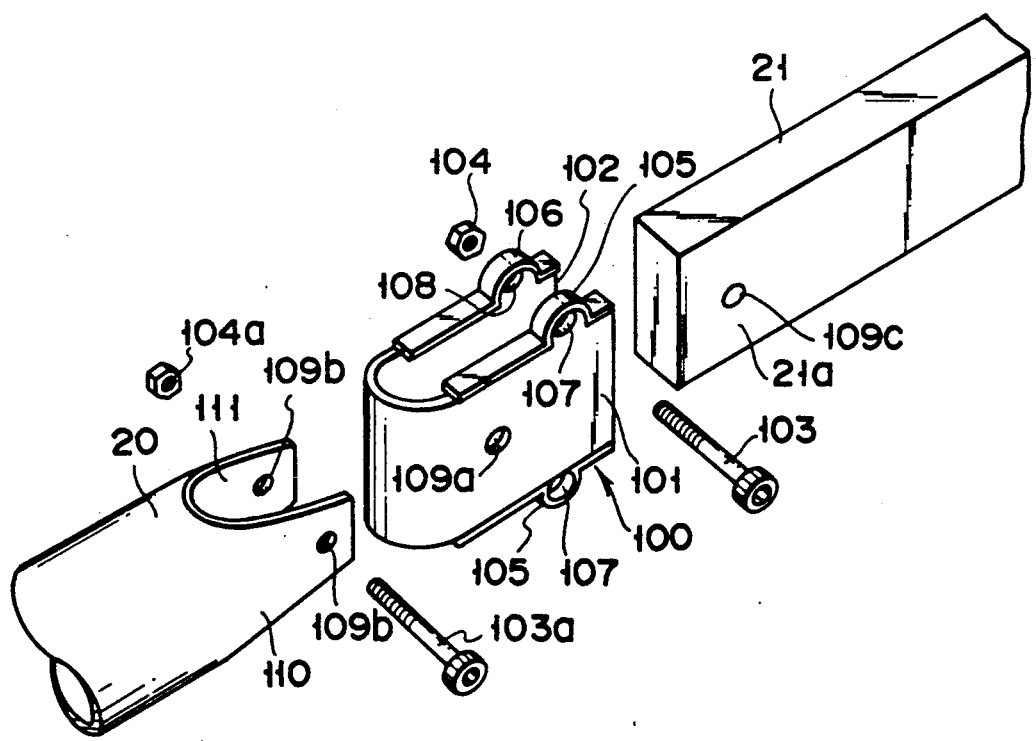
FIG. 8 is an exploded perspective view of the suspension system shown in FIG. 7.

In a third embodiment shown in FIGS. 7 and 8, a connecting fixture 100 is used to connect an end beam member 20 and an intermediate beam member 21. The fixture 100, which is made of metal such as steel, is bent substantially U-shaped, thus forming a pair of clamp pieces 101 and 102. An end portion 21a of the intermediate beam member 21 is inserted between the pieces 101 and 102, and is clamped in the thickness direction by means of a suitable number of bolts 103 and nuts 104. The bolts 103 are passed individually through holes 107 and 108 in lugs 105 and 106 which are formed on the clamp pieces 101 and 102, respectively.

The connecting fixture 100 is fixed to the end beam member 20 by welding. More specifically, a pair of extension portions 110 and 111, which are provided at the end of the beam member 20, are welded to the fixture 100 at welding areas 112 in a manner such that the fixture 100 is held between the portions 110 and 111. A bolt 103a is passed through holes 109a in the clamp pieces 101 and 102, holes 109b in the extension portions 110 and 111 and a hole 109c in the intermediate beam member 21, and a nut 104a is screwed on the bolt 103a.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A suspension system for a vehicle connecting a vehicle body and axle means, comprising:

left and right cantilever spring arms both made of fiber reinforced plastic, each spring arm having a fixed end fixed to the vehicle body and a free-end portion extending toward the axle means and being vertically bendable, said free-end portion being connectable to said axle means;

a beam assembly extending in the transverse direction of the vehicle body and having connecting portions connected to the respective free-end portions of said left and right spring arms; and connecting means for connecting said free-end portions of said spring arms to said beam assembly;

said beam assembly including:

a pair of metallic end beam members provided at said connecting portions of said beam assembly and being coupled to the respective spring arms;

an intermediate beam member of fiber reinforced plastic having two opposite end portions, each opposite end portion being fixed individually to respective end beam members;

a pair of connecting boxes fixed individually to said end beam members, each connecting box having an opening portion into which each corresponding end portion of said intermediate beam member is inserted and an inner surface continuous with said opening portion;

a pair of wedge-shaped spacers interposed individually between said end portions of said intermediate beam member and the respective inner surfaces of said connecting boxes; and clamping means for maintaining the spacers inserted between said end portions of said intermediate beam member and said respective inner surfaces of said connecting boxes.

2. The suspension system according to claim 1, wherein each said spring arm includes a resin matrix and a large number of unidirectional continuous fibers extending along the longitudinal direction of the respective spring arm.

3. The suspension system according to claim 1, wherein said intermediate beam member includes a resin matrix and a large number of unidirectional continuous fibers extending along the longitudinal direction of the intermediate beam member.

4. The suspension system according to claim 1, wherein said intermediate beam member has a rectangular profile.

5. The suspension system according to claim 1, wherein each said end beam member is formed of a cylindrical metal pipe.

6. The suspension system according to claim 1, wherein said connecting means includes U-bolts and nuts.

7. The suspension system according to claim 1, wherein said clamping means clamps each of said wedge-shaped spacers to a respective connecting box.

8. The suspension system according to claim 7, wherein said clamping means comprises a bolt extending from an end of each of said wedge-shaped spacers and passing through an opening in said respective connecting boxes, and threaded means engaged with said respective bolts.

9. A suspension system for a vehicle connecting a vehicle body and axle means, comprising:

left and right cantilever spring arms both made of fiber reinforced plastic, each spring arm having a fixed end fixed to the vehicle body and a free-end portion extending toward the axle means and being vertically bendable, said free-end portion being connectable to said axle means;

a beam assembly extending in the transverse direction of the vehicle body and having connecting portions connected to the respective free-end portions of said left and right spring arms; and connecting means for connecting said free-end portions of said spring arms to said beam assembly;

said beam assembly including:

a pair of metallic end beam members provided at said connecting portions of said beam assembly and being coupled to the respective spring arms;

an intermediate beam member of fiber reinforced plastic having two opposite end portions, each opposite end portion being fixed individually to respective end beam members;

a pair of U-shaped connecting fixtures fixed individually to said respective end beam members, and each connecting fixture including a pair of clamp pieces holding each corresponding end portion of said intermediate beam member therebetween; and fixing means for fixing said clamp pieces of said connecting fixtures to said intermediate beam member.

10. The suspension system according to claim 9, wherein each said spring arm includes a resin matrix and a large number of unidirectional continuous fibers extending along the longitudinal direction of the respective spring arm.

11. The suspension system according to claim 9, wherein said intermediate beam member includes a resin matrix and a large number of unidirectional continuous fibers extending along the longitudinal direction of the intermediate beam member.

12. The suspension system according to claim 9, wherein said intermediate beam member has a rectangular profile.

13. The suspension system according to claim 9, wherein each said end beam member is formed of a cylindrical metal pipe.

14. The suspension system according to claim 9, wherein said connecting means includes U-bolts and nuts.

15. The suspension system according to claim 9, wherein said fixing means comprises means for pressing said clamp pieces of a pair of clamp pieces together, with said end portion therebetween.

16. The suspension system according to claim 15, wherein said fixing means comprises bolt means connected to said pair of clamp pieces.

17. The suspension system according to claim 16, wherein said bolt means comprises a bolt member passing through said pair of clamp pieces, through said end portion of said intermediate beam member, and through an end beam member, to clamp them together.

* * * * *

UNITED STATES PATENT AND TRADEMARK OFFICE
CERTIFICATE OF CORRECTION

PATENT NO. : 5,129,672
DATED : July 14, 1992
INVENTOR(S) : Hiromoto, et. al.

It is certified that error appears in the above-indentified patent and that said Letters Patent is hereby corrected as shown below:

On the Title page, item [56] References Cited: Change U.S. Patent "2,953,272" (Haley) with --2,953,392--.

Signed and Sealed this

Twenty-eighth Day of September, 1993

Attest:

BRUCE LEHMAN

Attesting Officer

Commissioner of Patents and Trademarks